UNITED STATES PATENT OFFICE 1,941,437

COMPOSITION OF MATTER AND METHOD OF MAKING THE SAME

Harold H. Jordan, Manheim Township, Lancaster County, Pa., assignor to Armstrong Cork Company, Lancaster, Pa., a corporation of Pennsylvania No Drawing. Application November 17, 1931
Serial No. 575,639

4 Claims. (Cl. 106—23)

My invention relates to a composition of matter and to the method of making the same. It provides a material which may be in sheet form or may be molded or worked into any desired shapes. My material may be used to form stoppers, gaskets, washers and the like.

It is an object of my invention to provide a material that will be extremely resistant to attack by organic solvents. It is a further object of my invention to provide a composition of matter which will be tough and durable. It is a further object of my invention to provide a material that will be flexible and will retain its flexibility indefinitely.

Heretofore it has been impossible to form a satisfactory seal for liquids containing low-boiling organic solvents such as esters, ketones and alcohols because of the deleterious effect of the solvent on the gasket material.

My new composition consists of cork filler, a casein binder and a glue binder. Although the proportions of the materials may be varied, I prefer to use approximately 59.2% of casein binder, 16% of a glue binder and 24.8% cork filler.

A preferred form of casein binder consists of

|  | Percent |
|---|---|
| Casein | 32.7 |
| Glycerine | 37.15 |
| Reclaimed rubber | 12.75 |
| Sodium silicate | 12.4 |
| Triethanolamine | 5.0 |

The glycerine is used as a plasticizer and prevents the composition from becoming horny in character. The reclaimed rubber is used in colloidal dispersion in a strong alkali such as sodium hydroxide, potassium hydroxide or sodium carbonate. The sodium silicate is that known commercially as "N" grade and contains approximately 62.1% of water. The triethanolamine is an organic alkali and is used to produce a more alkaline reaction with less liquid. The sodium silicate also tends to increase the alkalinity of the binder. The triethanolamine and the sodium silicate together cause the swelling of the casein. The swelling of the casein changes it from a solid to a gelatinous material. Apparently when the casein swells it forms a protective coating around the rubber molecules. The rubber increases the toughness and tensile strength of the composition but is not affected by the organic solvents. The triethanolamine also adds to the toughness and flexibility of the composition.

Latex or crepe rubber may be substituted for all or a portion of the reclaimed rubber. Whenever crepe rubber is used, the casein, glycerine, sodium silicate, triethanolamine, and reclaimed rubber, if any is used, is put on the mixing rolls and the mass is mixed until it becomes soft. Then the crepe rubber is added and the mixing is continued until the mixture is homogeneous. Latex may be used in place of the reclaimed rubber without any special mixing operation.

Instead of using triethanolamine I may substitute either mono- or diethanolamine. It is also possible to use other organic alkalies such as the methanolamines or propanolamines. It will be understood that the exact percentage of organic alkali used will depend upon the alkalinity of the particular alkali or combination of alkalies used.

The glue binder I prefer to use contains approximately 43% glue, 43% glycerine and 14% water. The water causes the glue binder to swell. The glue binder is tougher and more flexible than the casein binder and imparts these characteristics to the casein binder when the two are combined. The glue binder swells faster than the casein binder. Therefore the two binders are made separately.

The filler for my composition is preferably made of cork that has been ground fine enough to pass through a 50 mesh screen.

My composition is formed by rolling the casein binder on mixing rolls until the casein has been properly dispersed. The mixing rolls are maintained at a temperature of from 180 to 190° F. The casein is dispersed sufficiently when specks of casein are no longer visible in the composition. The glue binder is then added and the mixing continued until a homogeneous mass is obtained. After the glue and casein binders have been mixed until a homogeneous mass is obtained the cork filler is added while the material is still on the mixing rolls. The homogeneous mass thus obtained is allowed to cure for one day. The curing period increases the tensile strength of the composition and toughens it.

For most purposes the tannin naturally present in the cork is sufficient to tan the glue and casein binder. As soon as the casein and glue are reacted by tannin a chemical reaction takes place causing the glue and casein to become insoluble. About nine months to one year is required for this chemical combination to be complete. The composition may be reworked on warm rolls any time prior to the completion of the tanning reaction. In orther words, my composition may be kept up to about nine months without affecting its workability. This time is sufficiently long so that after I make my composition and stamp out stoppers, gaskets, washers, or the like, I may rework the scrap without any trouble and stamp out additional articles. In this manner all waste material is substantially eliminated. Other cork compositions become practically unworkable if they are allowed to stand for any length of time after they are formed. My composition retains its workability because the protein is not completely tanned and the rubber is not vulcanized.

My composition is particularly suitable for use in making gaskets for sealing organic compounds such as esters, ketones and alcohols. Although the protein is not completely tanned and the rubber is not vulcanized, my composition has an extremely high tensile strength and is very flexible. In many instances it is possible to use my composition as a substitute for leather.

Additional tanning agents such as formaldehyde or ammonium dichromate may be added to the composition if quicker tanning is desired. Immediate tanning might be desirable where it is desired to use the material for making oil pump gaskets. In this case the tanning would be desirable to prevent the softening of the glue and casein by the frictional heat developed by the piston. In some cases it may also be desirable to add an accelerator to vulcanize the rubber in the composition to obtain a tougher product. Neither the tanning action nor the vulcanization of the rubber has any effect on the composition as far as its resistance to organic solvents is concerned. However, either of these reactions will prevent reworking of the composition.

While I have described a preferred embodiment of my invention and indicated certain uses for the material it will be understood, however, that this is by way of illustration only and that various details may be modified without departing from the spirit or scope of my invention, and I do not desire to be limited to the specific modification except as recited in the appended claims.

I claim:

1. A plastic composition of matter free of materials soluble in organic solvents capable of being worked and cured and reworked after curing into a gasket for organic solvents comprising a casein compound, plasticized glue and comminuted cork, said casein compound including rubber, glycerin and an ethanolamine, said rubber being isolated by a protective colloid formed of ethanolamine caseinate.

2. A plastic composition of matter made in accordance with the method of claim 3 and comprising a casein compound, plasticized glue, comminuted cork and a tanning agent, said casein compound including rubber, glycerin and an ethanolamine.

3. In the method of making a composition of matter for use in the manufacture of gaskets and the like, the steps consisting in milling at an elevated temperature a compound including casein, glycerin, rubber and an ethanolamine; introducing a plasticized glue while continuing the milling; adding comminuted cork; milling the mass until a homogeneous mix is obtained and curing the mix.

4. In the method of making a composition of matter for use in the manufacture of gaskets and the like, the steps consisting in milling at an elevated temperature a compound including casein, glycerin, rubber and an ethanolamine; introducing a plasticized glue while continuing the milling; adding comminuted cork and a tanning agent; milling the mass until a homogeneous mix is obtained and curing the mix.

HAROLD H. JORDAN.